Jan. 21, 1964 S. A. SANIEWSKI 3,118,660
TORSION SPRING
Filed Sept. 27, 1963 2 Sheets-Sheet 1
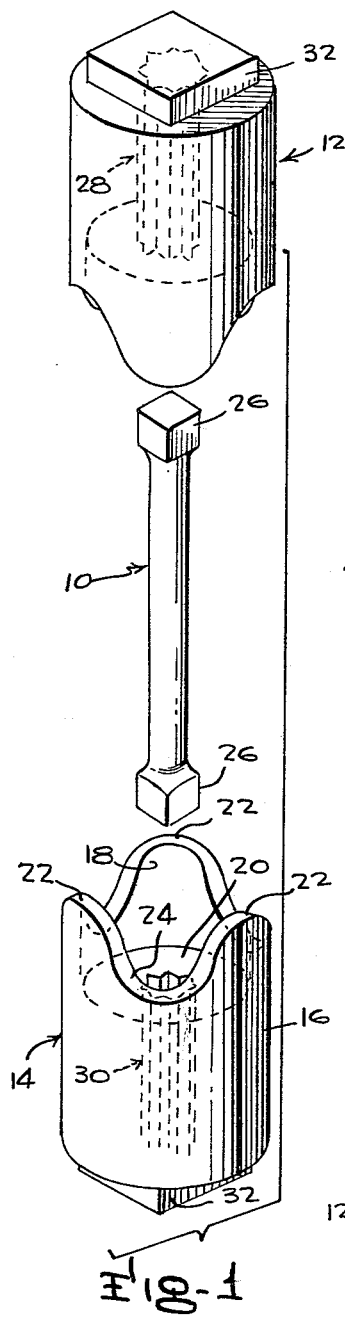
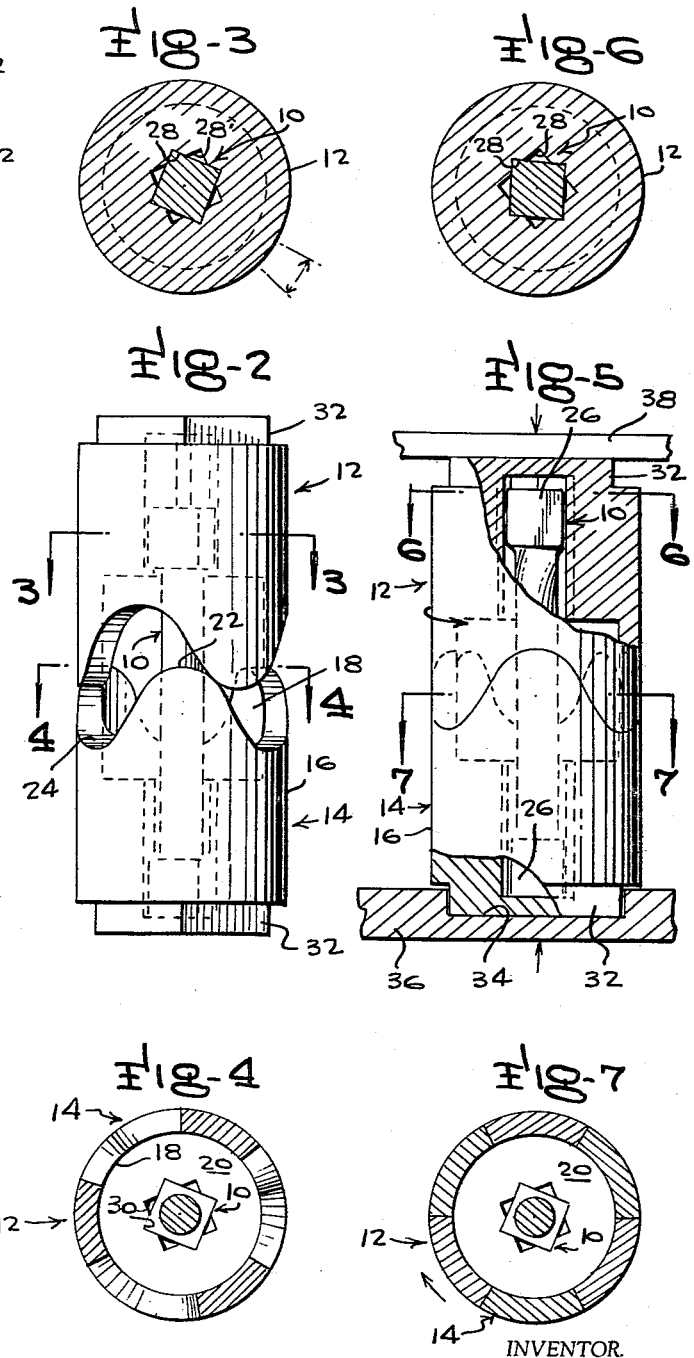
INVENTOR.
STANLEY A. SANIEWSKI
BY
McMorrow, Berman & Davidson
ATTORNEYS Jan. 21, 1964   S. A. SANIEWSKI   3,118,660
TORSION SPRING
Filed Sept. 27, 1963   2 Sheets-Sheet 2
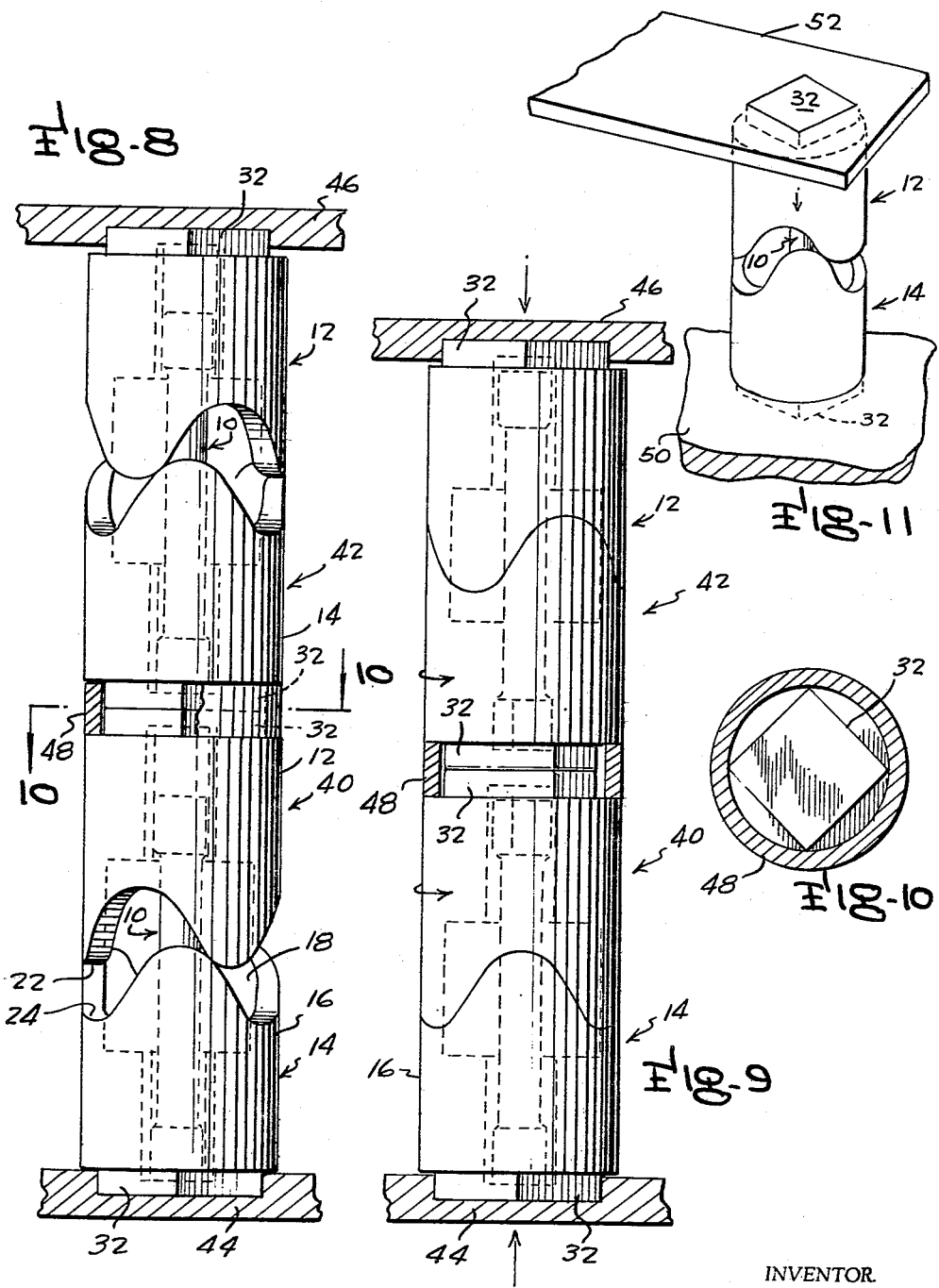
INVENTOR.
STANLEY A. SANIEWSKI
BY
McMorrow, Berman & Davidson
ATTORNEYS United States Patent Office 3,118,660
Patented Jan. 21, 1964

3,118,660
TORSION SPRING
Stanley A. Saniewski, 144 Blaine St., Passaic, N.J.
Filed Sept. 27, 1963, Ser. No. 312,194
4 Claims. (Cl. 267—57)

This invention relates to torsion springs, in general, such as used for instance, as shock absorbers on vehicles, but not limited to such use.

It is a general object of the invention to provide a cyclically-actuated spring device, in which linearly-reciprocating motion is converted to movement of torsion in an elastic member.

More particularly, it is an object to provide reciprocating cam elements inducing a rotary motion which is imparted as twist to a torsion member.

In still greater particularity, it is an object to provide a spring device as aforesaid, in which the direction of rotary movement is selective.

These and other objects, which will be apparent, are attained by the present invention, a preferred form of which is described in the following specification, as illustrated in the drawing, in which:

FIGURE 1 is a bracketed view, in perspective, of the three component parts of the spring device, in exploded form;

FIGURE 2 is a side elevational view of the assembled components, with the unit in expanded, un-energized condition;

FIGURE 3 is a transverse, sectional view through one of the cam sleeves or tubes, taken on the plane of the line 3—3 of FIGURE 2;

FIGURE 4 is another transverse, sectional view, taken on the plane of the line 4—4 of FIGURE 2;

FIGURE 5 is a view similar to FIGURE 2, showing the parts in compressed condition, and the torsion element energized;

FIGURE 6 and 7 are transverse, sectional views taken on the planes of the respective lines, 6—6 and 7—7 of FIGURE 5;

FIGURE 8 is a side elevational view of a bank of spring units, arranged in tandem, with the parts fully expanded;

FIGURE 9 is a view similar to FIGURE 8, showing the parts fully compressed;

FIGURE 10 is a transverse, sectional view, taken on the plane of the line 10—10 of FIGURE 8, and FIGURE 11 is a perspective view of a single unit, in a modified mounting, Referring to the drawings by characters of reference there is shown, in FIGURES 1–7, a three-part unit comprising a torsion rod 10, and cylindrical, end cups 12, 14, the latter being identical in construction except for the orientation of central wells therein, which serve as keying slideways, or splines, for the torsion element, as will appear hereinafter. Considering the lower cup 14, it will be seen to comprise a cylindrical, outer surface 16, bored at one end to provide a relatively thin, annular wall portion 18, extending to a transverse, bottom surface 20. The flat, upper edge of wall section 18 is undulatory, or sinusoidal, in form, with alternate crests 22, and troughs 24, preferably three each, in number, and constituting the cam elements when arranged in cooperative relation to the corresponding edge on upper cup 12. With reference to FIGURES 5 and 2, it will be seen that these identical scalloped edges will mate closely in the collapsed position of the parts (FIGURE 5), and will have only limited, line contact when the parts are separated (FIGURE 2). It will be at once apparent that the parts will move from a position as in FIGURE 2, to a position as in FIGURE 5, when the end cups are made to approach and the consequent, relative motion of rotation of the cups is made to communicate torsion to the element 10 by a keyed connection therewith. Thus, the element 10, shown as circular in cross-section, but which may have other forms, and may be tubular or solid, has identical, headed ends 26, of square or other non-circular cross-section, adapted for a close, but easy, sliding fit in splined wells 28, 30 in the respective cups, 12, 14, having mating cross-sections of serrate outline. Each pair of side faces at opposite ends of torsion member 10 are parallel, and in fact, co-planar, and, therefore, in order to provide the staggered relation of the cams, in the separated condition of the parts, shown in FIGURE 2, the receiving wells 28, 30 will be oriented at different angles from a reference position on the cam surfaces, such as a trough or a crest for instance, and the value of the selected angle will give the angular extent of the cam surface utilized. In the three-lobe cam shown, this range may vary from a very small angle to a value close to, but less than 60°.

In order to allow for either right or left-hand rotation, the square, slide passages are symmetrically provided in duplicate, as indicated by the eight-cornered star configurations shown in FIGURES 3, 4, 6 and 7. The square passages selected, in the arrangement shown in FIGURES 3–7 will be evident from the cross-hatching of the torsion element 10. This results in the initial cam position shown in FIGURE 2, and rotation resultant upon approach of the end units will be in the direction indicated by the arrows in FIGURES 5–7. These figures illustrate the case where both end cups are free to rotate, in which case, each contributes half of the twist, but in the case where one is restrained against rotation, the other would furnish the full twist, with its direction of rotation still as shown by its arrow.

If the alternative passage of either end member had been selected, the opposite sides of the cam lobes would furnish the lines of contact, and the direction of twist would be opposite from that indicated in FIGURES 5–7. This feature of selective direction of rotation assumes a particular importance in an arrangement of the spring units, in nested, or stacked relation, that is, in tandem.

Obviously, the depth of wells 28 and 30 will be sufficient to accommodate the maximum penetration by the torsion element.

In some uses, one or both of the end cups may be held against rotation, and for this purpose the cups 12 and 14 are provided at their outer ends with bosses 32, of square cross-section. For a purpose to be set forth hereinafter, bosses 32 are reduced in lateral dimensions, with respect to cups 12, 14, their diagonal being somewhat shorter than the diameter of the cups. For general, illustrative purposes, the lower boss 32 is shown as engaged in a mating, square recess 34 in a structural member 36, while the upper boss 32 merely makes end face contact with the surface of a structural member 38. It would also be possible to rotatably mount the upper end of the upper cup 12 in a sleeve carried by member 38.

From the foregoing, it will be clear that any load, applied at one or both ends of the spring unit, will immediately bring the cam surfaces into action, with resultant, relative rotation of the cups, and the imparting of a twist to torsion member 10, against the elastic forces thereof, and that when application of the applied force ceases, the element 10 will revert to its position of rest, causing relative rotation between the end cups, which, in turn, brings the cam surfaces into play, to separate the cups.

In the particular embodiment shown, the two alternative square wells in each cup have been arranged so that the corners, or star points are equi-angularly spaced at intervals of 1/8 of a circle, or 45°. This constitutes an efficient position of utilization of the cam surface since it would be undesirable to provide a cam interval too close to 60°, where the crests of the cam lobes would be on dead center.

FIGURES 8 and 9 illustrate the stacking, or employment in tandem, of the spring units. Herein, two complete units, 40 and 42, are arranged end-to-end, between a fixed member 44, and a movable member 46, the end bosses 32 of the units being keyed against rotation, in square wells in the members 44 and 46. The slide passages selected for torsion elements 10 in the two units are such that upper cup 12 of unit 40 and lower cup 14 of the unit 42 rotate in the same direction, as indicated by the arrows in FIGURE 9, which, among other things, avoids surface slippage, and consequent friction and malfunction. Upon cessation of the compressive force, the rotating cup 12 will be induced to ride up the cam surface of its cup 14, and the rising, and rotating cup 14 will move its cam track in a manner to move the uppermost cup 12 upwardly. At the end of the cycle the parts will have returned to the positions of rest shown in FIGURE 8, in which the central pair of cups are spaced from both of the outermost cups.

In order to restrain the inner ends of the respective components of a tandem system against relative lateral movement, or displacement, a ring member 48 may be provided in closely encircling relationship to the contacting, inner bosses, the outer surface of the ring preferably being flush with those of cups 40 and 42.

FIGURE 11 illustrates an arrangement wherein both bosses 32 of a single unit are engaged in square recesses, the lower one in a fixed member 50, and the upper one in a rotatable member 52.

Many modes of use of the present invention will find their suggestion therein, or arise from practices known to the prior art. For instance, in relation to the demands of certain problems which will be encountered, it may be found necessary, or expedient to provide the spring devices, in multiple, as components of a single unit, with torsion elements of varying strength intended for handling different phases of loading, and hence brought into play sequentially. It may also be found expedient to provide elements of the same strength, even though in multiple.

While the tandem arrangement has been shown in the vertical position, other angles of use, including the horizontal, are possible.

The spring unit, which may be fabricated of metal, or plastic, or a combination of both, will find use in substitution for shock absorbers, heretofore hydraulic in operation, and which become aerated and tend to fade, with unduly short life.

It will be understood that a single cam lobe could be made to work, but would entail an imbalance, and tilting, which would be undesirable, and it would seem that three lobes (or cycles) would be the minimum for optimum performance, as well as the maximum when considered from other standpoints, such as that of economy. However, cams with more than three lobes may be employed.

It will also be understood that whereas splines have been shown in both cups, the system would operate in the case where the torsion shaft 10 was fixed to one cup, and slidable only in the other.

I claim:

1. A spring device adapted to convert linearly reciprocating motion to torsional rotation, comprising a pair of cylindrical members having mating, circularly-disposed cam tracks on end faces, an elastic torsion shaft arranged generally axially of said members, and with at least one end slidably mounted in one of said members, for relative movement axially thereof, and means restraining rotation of said shaft with respect to said members, said cam tracks being offset from full mating position in the condition of zero torsional stress in the shaft.

2. A device as in claim 1, said means comprising a splined connection between the shaft and said one of said members.

3. A device as in claim 1, said means comprising a splined connection between the shaft and said one of said members, the portions of the splined connection in said shaft being arranged in duplicate, for selected positioning of said one of said members on said shaft in either of two alternative positions on said cam track, whereby to achieve selective direction of rotation.

4. A device as in claim 1, said cam track being undulatory, with an integral number of cycles.

References Cited in the file of this patent

UNITED STATES PATENTS

| | | |
|---|---|---|
| 2,000,095 | Rockefeller | May 14, 1935 |
| 2,351,194 | Daries | June 13, 1944 |
| 2,523,479 | O'Connor | Sept. 26, 1950 |